US011356451B2

(12) United States Patent
Valente et al.

(10) Patent No.: US 11,356,451 B2
(45) Date of Patent: Jun. 7, 2022

(54) CUBE-BASED USER INTERFACE FOR ONLINE COMMUNITY

(71) Applicants: Sheryldene-Anne Valente, Pretoria (ZA); Lorenzo Michael Valente, Pretoria (ZA); Johannes Jacobus Earnest Kapp, Pretoria (ZA); Petrus Stephanus de Villiers, Pretoria (ZA); Armand Ventura, New York, NY (US)

(72) Inventors: Sheryldene-Anne Valente, Pretoria (ZA); Lorenzo Michael Valente, Pretoria (ZA); Johannes Jacobus Earnest Kapp, Pretoria (ZA); Petrus Stephanus de Villiers, Pretoria (ZA); Armand Ventura, New York, NY (US)

(73) Assignee: MIBLOK/SHERYLDENE-ANNE VALENTE, New Braunfels, TX (US)

( * ) Notice: Subject to any disclaimer, the term of this patent is extended or adjusted under 35 U.S.C. 154(b) by 173 days.

(21) Appl. No.: 16/450,254

(22) Filed: Jun. 24, 2019

(65) Prior Publication Data
US 2020/0007551 A1    Jan. 2, 2020

Related U.S. Application Data

(63) Continuation-in-part of application No. 15/007,776, filed on Jan. 27, 2016, now abandoned.
(Continued)

(51) Int. Cl.
*G06F 16/28* (2019.01)
*H04L 9/40* (2022.01)
(Continued)

(52) U.S. Cl.
CPC ............ *H04L 63/102* (2013.01); *G06F 3/016* (2013.01); *G06F 3/04815* (2013.01);
(Continued)

(58) Field of Classification Search
CPC .................................................. G06Q 10/1093
See application file for complete search history.

(56) References Cited

U.S. PATENT DOCUMENTS

| 5,678,015 A | * 10/1997 | Goh ..................... G06F 3/04815 345/419 |
| 6,222,551 B1 | * 4/2001 | Schneider ............... G06T 15/20 345/419 |

(Continued)

FOREIGN PATENT DOCUMENTS

WO    WO-2012150375 A1 * 11/2012    ........... G06F 3/0481

OTHER PUBLICATIONS

W. Cellary, W. Wiza and K. Walczak, "Visualizing Web search results in 3D," in Computer, vol. 37, No. 5, pp. 87-89, May 2004, doi: 10.1109/MC.2004.1297255. (Year: 2004).*
(Continued)

*Primary Examiner* — Brittany N Allen
(74) *Attorney, Agent, or Firm* — Schwegman Lundberg & Woessner, P.A.

(57) ABSTRACT

A security system and method for use on a global computer network, such as the Internet, allows for the creation, development, maintenance and sharing of information to enable verified and authenticated (accredited) members to interact in a highly secure environment. Accredited members are represented by a three dimensional graphical cube and are classified under one of four categories/groups, namely: People; Products; Places; or Services. Each cube is assigned a unique global serial number, barcode or QR code. The six sides of each cube correspond to the six generic questions, who, what, where, when, why and how, and the data information applicable to each generic question is stored on the respective one of the six sides of the cube. The cubes are all linked to one another, thereby enabling accred-
(Continued)

ited members to communicate and interact efficiently on all socio and economic levels with a high degree of trust.

10 Claims, 16 Drawing Sheets

Related U.S. Application Data

(60) Provisional application No. 62/174,941, filed on Jun. 12, 2015.

(51) Int. Cl.

| | | |
|---|---|---|
| *G06F 21/62* | (2013.01) | |
| *G06F 3/14* | (2006.01) | |
| *G06F 3/04815* | (2022.01) | |
| *G06F 16/27* | (2019.01) | |
| *G06F 16/26* | (2019.01) | |
| *G06F 16/23* | (2019.01) | |
| *G06F 16/25* | (2019.01) | |
| *G06Q 50/00* | (2012.01) | |
| *G06Q 20/00* | (2012.01) | |
| *G06F 3/04817* | (2022.01) | |
| *G06Q 10/02* | (2012.01) | |
| *G06F 3/04842* | (2022.01) | |
| *G06F 3/01* | (2006.01) | |
| *G06F 16/338* | (2019.01) | |

(52) U.S. Cl.
CPC ...... *G06F 3/04817* (2013.01); *G06F 3/04842* (2013.01); *G06F 3/14* (2013.01); *G06F 16/23* (2019.01); *G06F 16/25* (2019.01); *G06F 16/26* (2019.01); *G06F 16/27* (2019.01); *G06F 16/285* (2019.01); *G06F 16/338* (2019.01); *G06F 21/6218* (2013.01); *G06F 21/6245* (2013.01); *G06Q 10/02* (2013.01); *G06Q 20/00* (2013.01); *G06Q 50/01* (2013.01); *H04L 63/104* (2013.01); *H04L 63/105* (2013.01); *G06F 2203/04802* (2013.01)

(56) References Cited

U.S. PATENT DOCUMENTS

| | | | | |
|---|---|---|---|---|
| 7,860,815 | B1* | 12/2010 | Tangirala | G06N 5/02 |
| | | | | 706/45 |
| 9,069,455 | B2* | 6/2015 | Sripada | G06T 19/00 |
| 9,111,281 | B2* | 8/2015 | Stibel | G06Q 30/018 |
| 9,787,662 | B1* | 10/2017 | Nair | H04L 63/1408 |
| 10,032,164 | B2* | 7/2018 | Nahari | H04L 63/126 |
| 2003/0142136 | A1* | 7/2003 | Carter | G06F 3/04815 |
| | | | | 715/782 |
| 2004/0249809 | A1* | 12/2004 | Ramani | G06V 30/1988 |
| 2007/0130137 | A1* | 6/2007 | Oliver | G06F 16/245 |
| 2008/0040314 | A1* | 2/2008 | Brave | G06F 16/9535 |
| 2008/0065742 | A1* | 3/2008 | Lun | G06F 16/358 |
| | | | | 709/217 |
| 2012/0254785 | A1* | 10/2012 | Nakajo | G06Q 10/1093 |
| | | | | 715/772 |
| 2012/0272191 | A1* | 10/2012 | Dubs | G06F 3/04883 |
| | | | | 715/851 |
| 2012/0323890 | A1 | 12/2012 | Dixon et al. | |
| 2013/0097563 | A1* | 4/2013 | Pacheco Rodrigues Velho | |
| | | | | G06F 3/04815 |
| | | | | 715/850 |
| 2014/0258938 | A1* | 9/2014 | Christmas | G06F 3/04815 |
| | | | | 715/849 |
| 2014/0279605 | A1* | 9/2014 | Neilson | G06Q 30/018 |
| | | | | 705/317 |
| 2015/0347576 | A1 | 12/2015 | Endert et al. | |
| 2016/0364422 | A1 | 12/2016 | Kapp et al. | |
| 2018/0341994 | A1* | 11/2018 | Rojahn | G06Q 30/02 |
| 2019/0361933 | A1* | 11/2019 | Rogynskyy | G06F 16/24578 |

OTHER PUBLICATIONS

Rodrigues, Diego & Oakley, Ian. (2009). Social Circles: A 3D User Interface for Facebook. 838-839. 10.1007/978-3-642-03658-3_89. (Year: 2009).*

"U.S. Appl. No. 15/007,776, Final Office Action dated Jan. 22, 2019", 13 pgs.

"U.S. Appl. No. 15/007,776, Non Final Office Action dated Apr. 23, 2018", 13 pgs.

"U.S. Appl. No. 15/007,776, Response filed Oct. 23, 2018 to Non Final Office Action dated Apr. 23, 2018", 8 pgs.

* cited by examiner

Security Levels for People, Products, Places and Services

Security Levels Questions for Verification Purposes

| | Level 3 / Layer 3<br>Associate<br>(Friends) | Level 4 / Layer 4<br>Personal<br>(Family) | Level 5 / Layer 5<br>(Core)<br>Private<br>(One & Only) |
|---|---|---|---|
| People | Names of 5 (minimum) Associates (friends)<br>ID<br>Connection Details (where did you meet and how many years of friendship)<br>Associate (friend) Details (cellphone/mobile, email address, residential address, occupation etc.)<br>Any other means deemed necessary by MiBlok from time to time | Name<br>ID<br>Relationship Details (Mother, father etc.)<br>Contact Details<br>Address and/or geo-location of their home residences<br>Address and/or geo-location of their workplace<br>If adopted and/or fostered, name of agency<br>Any other means deemed necessary by MiBlok from time to time | Medical Records<br>Blood Tests<br>DNA<br>Fingerprint<br>Facial Recognition<br>Retina Display<br>Any other means deemed necessary by MiBlok from time to time |
| Products | Determined number of Level 3 MiBlok members confirmed, with minimum numbers continuously maintained.<br>Any other means deemed necessary by MiBlok from time to time | Determined number of Level 4 MiBlok members confirmed, with minimum numbers continuously maintained.<br>Any other means deemed necessary by MiBlok from time to time | Determined number of Level 5 MiBlok members confirmed, with minimum numbers continuously maintained.<br>Any other means deemed necessary by MiBlok from time to time |

FIG. 12 continued

Security Levels Questions for Verification Purposes

|  | Level 1 / Layer 1<br>(Outermost layer)<br>Public (General) | Level 2 / Layer 2<br>*Affiliate* |
|---|---|---|
| Places | Name of Place<br>Photo<br>Deed of property owned<br>Geolocation (latitude and longitude as a world standard)<br>Classification in governance of public, county, municipal in order of private, residential and commercial correspondingly<br>Confirmation of city landmarks<br>Confirmation of Homeowners Association<br>Confirmation of registration and membership of sporting associations<br>Any other identification<br>Any other means deemed necessary by MiBlok from time to time | Determined number of Level 2 MiBlok members confirmed, with minimum numbers continuously maintained.<br>Any other means deemed necessary by MiBlok from time to time |
| Services | Name of Service<br>Proof of business ownership/municipality/associations etc.<br>Photo<br>Proof of Intellectual Property<br>Trademark<br>Classification in governance regarding licensing, registration documents (health and safety, ISO standards etc.)<br>Geolocation of (latitude and longitude as a world standard)<br>Classification of governance of formal or informal..<br>Current business status is planning, development, production and distribution<br>Identification of big, medium and small business enterprise in order of formal to informal industry operation type such as medical, agriculture, finance, etc.<br>Councils and governance services...<br>Any other identification<br>Any other means deemed necessary by MiBlok from time to time | Determined number of Level 2 MiBlok members confirmed, with minimum numbers continuously maintained.<br>Any other means deemed necessary by MiBlok from time to time |

FIG. 12 continued

Security Levels Questions for Verification Purposes

|  | Level 3 / Layer 3<br>Associate<br>(Friends) | Level 4 / Layer 4<br>Personal<br>(Family) | Level 5 / Layer 5<br>(Core)<br>Private<br>(One & Only) |
|---|---|---|---|
| Places | Determined number of Level 3 MiBlok members confirmed, with minimum numbers continuously maintained. Any other means deemed necessary by MiBlok from time to time | Determined number of Level 4 MiBlok members confirmed, with minimum numbers continuously maintained. Any other means deemed necessary by MiBlok from time to time | Determined number of Level 5 MiBlok members confirmed, with minimum numbers continuously maintained. Any other means deemed necessary by MiBlok from time to time |
| Services | Determined number of Level 3 MiBlok members confirmed, with minimum numbers continuously maintained. Any other means deemed necessary by MiBlok from time to time | Determined number of Level 4 MiBlok members confirmed, with minimum numbers continuously maintained. Any other means deemed necessary by MiBlok from time to time | Determined number of Level 5 MiBlok members confirmed, with minimum numbers continuously maintained. Any other means deemed necessary by MiBlok from time to time |

FIG. 12 continued

CUBE-BASED USER INTERFACE FOR ONLINE COMMUNITY

This patent application is a Continuation-In-Part of co-pending patent application Ser. No. 15/007,776 filed on Jan. 27, 2016, which is based on provisional patent application Ser. No. 62/174,941 filed on Jun. 12, 2015.

BACKGROUND OF THE INVENTION

Field of the Invention

The invention relates to a system and method for use on a global computer network that allows for the creation, development, and maintenance and sharing of information on a diverse computer platform by only accredited members who have been verified and authenticated, and more particularly a system and method that focuses on full integration of all socio and economic activities by presenting a unique structure of integrating and linking People, Places, Products and Services, equally, using a global computer network and any compatible hardware devices.

Discussion of the Related Art

Currently, in the year 2019, the World Wide Web now boasts 4.1 billion users on-line. Technology has turned an extensive world into a global village by bringing a wider choice of people, products, places and services to our attention, in an instant, forcing upon us the perception that we can rely on the World Wide Web to supply truthful suitable answers to any question or solutions to any problem. However, the value, worth, accuracy, trustworthiness, or the identity about people, products, places or services is never 100 percent certain or reliable since the World Wide Web allows everyone with access to software and hardware to create and share content. Daily people continue to spend a great deal of unnecessary, and often unproductive time, online searching through an overwhelming amount of repetitive information that is not verified or authenticated, often arriving at an inconclusive or illusive result.

Moreover, a search result will not always be entirely accurate, resulting in wasted productivity, because of the freedom of website developers to employ clever marketing tactics to generate huge financial gain from advertising revenue by using matching key phrases and words. Understandably a first world environment may quickly become educated on this tactic, however, the balance of the global community, who are not continually exposed to updated news will find themselves none the wiser and pawns of this abuse.

The Internet has established a means for economic transactions using the electronic transfer of funds, that appear to be secure financial transactions, by users all over the world. However, fraud still exists with insufficient security, or at a high cost for effective security measures that need to be implemented and updated regularly.

In October of 2018, Comparitech published a comprehensive article compiled by Aimee O'Driscoll detailing statistics and facts highlighting the increasing threat of cybercrime on the World Wide Web. Below are excerpts from her article detailing alarming information on how fast cybercrime has grown and continues to grow.

Cybercrime Statistics: The Big Picture
Cybercrime damages are predicted to cost US$6 trillion annually by 2021.

Globally, cybercrime was the $2^{nd}$ most reported crime in 2016. (Source PWC)

In proportion to the total number of crimes, cybercrime now accounts for more than 50% of all crimes in the UK. (Source: National Crime Agency).

An attacker resides within a network for an average of 146 days before detection. (Source: Microsoft)

Most network intrusions—63 percent—are the result of compromised user passwords and usernames. (Source: Microsoft)

In 2016, 70% of all financial fraud in the UK was done through remote purchases using stolen information or cards. (Source: FFA UK)

Most cybercrime is now mobile. Over 60% of online fraud is accomplished through mobile platforms. Additionally, 80% of mobile fraud is accomplished through mobile apps instead of mobile web browsers. (Source: RSA)

McAfee finds that the average number of records lost to hacking in 2017 was 780,000 per day. (Source: McAfee)

Up to 0.80% of the world's GDP is now being lost to cybercrime. (Source: McAfee)

Cybercrime Directly Impacting Consumers

One of the more troubling trends we found for 2016 and 2017 is the impact on consumers. The stark increase in data breaches results in an unprecedented amount of compromised personal information. As more consumers become exposed to data-hungry criminals, it's increasingly apparent that personal protections against data theft are more important than ever.

In the U.S. consumers who fell victim to cyber criminals in 2015 spent an average of 21 hours dealing with the consequences, for a cost of around $358 per person. (Source: Symantec)

41% of people globally cannot properly identify a phishing email and often guess as to an email's legitimacy. (Source: Symantec)

2015-2016 saw identity takeover become the fastest-growing type of fraud in Australia and New Zealand, with up to 80% of reported cases of fraud falling into this category. (Source: Veda)

In the past year, nearly 700 million people in 21 countries experienced some form of cybercrime. (Source: Symantec)

Thanks to the growing number of data breaches, personal data is easier to buy on the dark web than ever. RSA reports personal data can cost as little as $0.20 to $15 USD. (Source: RSA)

A large amount of private and stolen consumer information is being shared online through social media groups built around such activity. (Source: RSA)

Cyber bullying is a primary concern in the U.S., where 64% of parents believe their children are more likely to experience bullying. (Source: Symantec)

Healthcare organizations continue to be heavily targeted with healthcare becoming the most cyber attacked industry. (Source: Symantec)

Organizations are increasing cyber security resources, but it is largely viewed as an IT issue rather than a risk management problem. (Source: Symantec)

Healthcare organizations need to operationalize cyber security strategies in order to defend themselves. (Source: Symantec)

Organizations are improving their cyber security strategies, but not enough to keep up with the risks imposed by the new technologies they adopt. (Source: KPMG)

There needs to be a mindset shift where cyber security enables innovation in order to avoid increased vulnerability. (Source: KPMG)

With mobile changing the way organizations interact with consumers, the number of fraud attempts through mobile channels is dramatically increasing. (Source: RSA)

The types of cybercrime is taking place are evolving, as is the way cybercriminals communicate. (Source: RSA)

The IoT opens up a whole new world of opportunity for attackers, with risks remaining largely unknown. (Source: RSA)

The Increasing Cost of Cybercrime

The Edward Snowdens and Panama Papers John Does are unfortunately rare examples of cyber criminals. Most cyber criminals aren't stealing data and leaking secrets for the sake of justice. Instead, most are out for personal gain, typically stealing money directly from consumers and businesses, or selling that data on the Dark Web. Regardless of their motivation, however, responding and stemming the tide of cybercrime is a massively costly endeavor.

$500 billion: Microsoft's estimate for the total potential cost of cybercrime to the global community in 2016. (Source: Microsoft)

$600 billion: The global cost of cybercrime in 2017. (Source: McAfee)

$14 billion: The amount of the U.S. government spent in 2017 on cyber security. The government intends to spend 19 million in 2017. (Source: CIO).

$2.1 trillion: The total global annual cost of all data breaches by 2019, as suggested by Juniper Research. (Source: Juniper Research)

$1.5 trillion: The total revenue cybercriminals coaxed out of their victims worldwide in 2017. (Source: RSA)

$158 billion: The collective amount of money consumers lost globally in 2015 due to cybercrime. The U.S. accounts for $30 billion of that loss. (Source: Symantec)

$16 billion: The Javelin Strategy & Research 2017 Fraud Report discovered that 15.4 million U.S. consumers (17.5% increase) lost $16 billion to identity fraud in 2016. This marked a rise from 2015, when 13.1 million victims lost $15.3 billion. (Source: Javelin Strategy & Research)

Cybercrime continues to be a massive problem facing governments, businesses, and the general public worldwide. According to Statista, cybercrime accounted for $1.33 billion in damages in 2016 in the U.S. alone. With massive cyber attacks occurring on a regular basis, things are seemingly out of control. The most effective way organizations and individuals can combat cybercrime is through improved cyber security. Professionals in this field are in high demand, and rightly so.

It's also no wonder that organizations across the globe are conducting studies and surveys and compiling in-depth reports all based around these topics. Such organizations include government bodies, multinational professional services firms, and security solution companies, among others. The focus of their studies include perception of cyber security and cybercrime, preparedness to tackle threats, and what the future holds.

Cloud services have been widely adopted by many organizations are not prepared to hand the cyber risks posed. (Source: Telstra)

Cloud security is one area that is getting a lot of attention and planned investment. (Source: Fortinet)

Almost all organizations have increased their IT security spends, demonstrating the perceived importance of this area. (Source: Telstra)

The topic of social engineering is bold enough as it is, however, in this section we can speculate and debate or provide facts about the condition of the broader society relating to the limitations or failure of different existing platforms, especially when it relates to security, fake id's, unnecessary searches, search times, monotonous searching and limited marketing abilities, to name a few.

That which can be measured, can be managed. In promulgating a safer, sustainable democracy and a more secured economy an effective starting point is to view the status of world wellbeing and happiness. Some of the criteria that contribute towards this global status being achieved, in no particular order are: governance, communities, education, health, jobs, income, environment, safety, housing, standardisation, protection of intellectual property, copyright protection, manufacturing of quality products, excellent service delivery and life satisfaction in general.

Pertinent to the dawn of the fourth industrial revolution (robotics, artificial intelligence and nanotechnology) it is important to review how socio-economic activities will be influenced.

The system and method of the present invention provides the following:

A different perspective on governance to avoid confusion by verifying and authenticating real people, real products, real places and real services for socio-economic purposes;

More secure and trustworthy interactions on all socio and economic platforms due to unique authentication processes;

Protection of intellectual property (e.g., copyright) due to strict authentication principles;

Accountability and traceability on all socio-economic interactions, which in turn will support prosecution if necessary; and Minimising and avoiding irregularities on all levels, due to the verifying and authenticating processes.

Objects and Advantages of the Invention

As a quality and productive conscience society, the system and method of the present invention seeks measurable, reliable and accurate outcomes.

Accordingly, it is an object of the present invention to provide a computer system that operates in a secure environment in which communications, transactions and information can be shared on a more reliable global computer network amongst accredited users.

It is a further object of the present invention to provide a system and method of linking authenticated members to a safer and more secured socio and economic world, where activities like online searching, communication/messaging and transactions/dealings are the main focus.

It is a further object of the present invention to provide an online system for members with high levels of security of each individual member, and wherein every member (with full control and accountability of their own data) has been verified and authenticated, thereby providing an online society of equal and ethical representation in each of the four categories namely people, products, places and services.

A process, unique to MiBlok, will be issuing an individual cube (that has a unique global individual serial number, barcode or QR code) to each member once verification and authentication is complete. Effectively the properties of a cube address the above mentioned challenges regarding socio and economic activities. The intention is to link everything in the categories of People, Products, Places and Services to it's own individual cube that will operate on the MiBlok platform, no matter where you are or even what computer or smart device you may choose to use.

It is yet a further object of the present invention to provide a system and method for use on a global computer network that provides a global solution to fight cybercrime.

It is still a further object of the present invention to provide a simple system will be designed to be recognized and used with ease and efficiency by young and old, ignorant to highly educated, from those who wish to just connect socially to those who wish to conduct larger and more complex transactions.

To achieve these objects and advantages, the system and method of the present invention provides the following unique structures and functions:

Firstly, all activities are incorporated in one of only four categories, namely People, Products, Places and Services. The present invention will accommodate this by allocating an individual cube, in one of these categories, to every accredited member.

Secondly, all member information is contained on a single cube and analyzed and accordingly placed on one of the six faces of the cube corresponding to Who, What, Why, When, Where and How.

Thirdly, security protection of accredited member information content is incorporated on each cube. The five levels of content security are Public, Affiliate, Associate, Personal and Private. This is accommodated in the form of onion skin layering. Social and business communication are made safer, easier and more accessible as a result of the above. The level of security and functionality varies depending on their level of verification.

Lastly, all accredited members can be linked, using geo-fencing, and enabled to communicate, search and find, share and transfer content, as well as transact, in a safer and more secure environment. This is as a result of being verified and authenticated as members. Everyone and everything can be accommodated on the system and platform of the invention.

BRIEF SUMMARY OF THE INVENTION

The invention relates to a system and method for use on a global computer network by creating a diverse security system where authenticity and trust is paramount, allowing: 1. a platform for only verified and authenticated members (represented by cubes) to interact freely and most importantly to retain ownership (full control and accountability) of their data content; or 2. worldwide recognition via a unique logo or icon on any other operating system on which the system and method of the present invention may be used. The system and method of registering, verifying and authenticating all new members will follow a procedure, unique to this invention, that will issue a unique global individual serial number/barcode/QR code that will remain linked to the issued cube forever.

A cube is the only unique entity that accommodates the six content labels that contain the necessary information that is normally on a website (e.g., of a person, company or other) regarding who, what, why, when, where and how.

The basic properties of the cube are employed using a cube's unique geometry, which is a three-dimensional solid object bounded by six square faces, facets or sides, twelve edges and eight vertices.

The geometric properties of the cube are simulated as per software requirements using a graphical user interface. This can be used on any operating system on any compatible electronic device on different platforms as a security system or its own online virtual platform.

The object of the online virtual community/society is to allow authenticated members who have been issued with a unique global individual serial numbered, bar coded or QR coded cube to be linked to user preferences pertaining to social or economic purposes. This allows members to interact with REAL people (not fake profiles), genuine products (not fake copies), actual places (not fake bed & breakfast or restaurant facilities) and quality accredited services (not poor sub-standard services). The system will flag any fake or substandard people, products, places or services. Since all members are represented by a single global individual serial numbered cube, it can only produce a more authenticated socio and economic world. Multiple people, products, places and services exist but with the authentication and flagging processes, a distinction can be made.

A global or de-centralized network security system is at the core of this system, operating a network of continuous (local and international) authentication procedures. These databases contain and manage all information about accredited members of the system and enable interaction between them. The information belonging to the accredited member (user) will be managed through a graphical user interface (with full control and accountability being the responsibility of the owner) using appropriate software on any compatible electronic device.

BRIEF DESCRIPTION OF THE DRAWINGS

For a fuller understanding of the nature of the present invention, reference should be made to the following detailed description taken in conjunction with the accompanying drawings in which.

Like reference numerals refer to like parts throughout the several views of the drawings.

DETAILED DESCRIPTION OF THE PREFERRED EMBODIMENT

Figure 1:
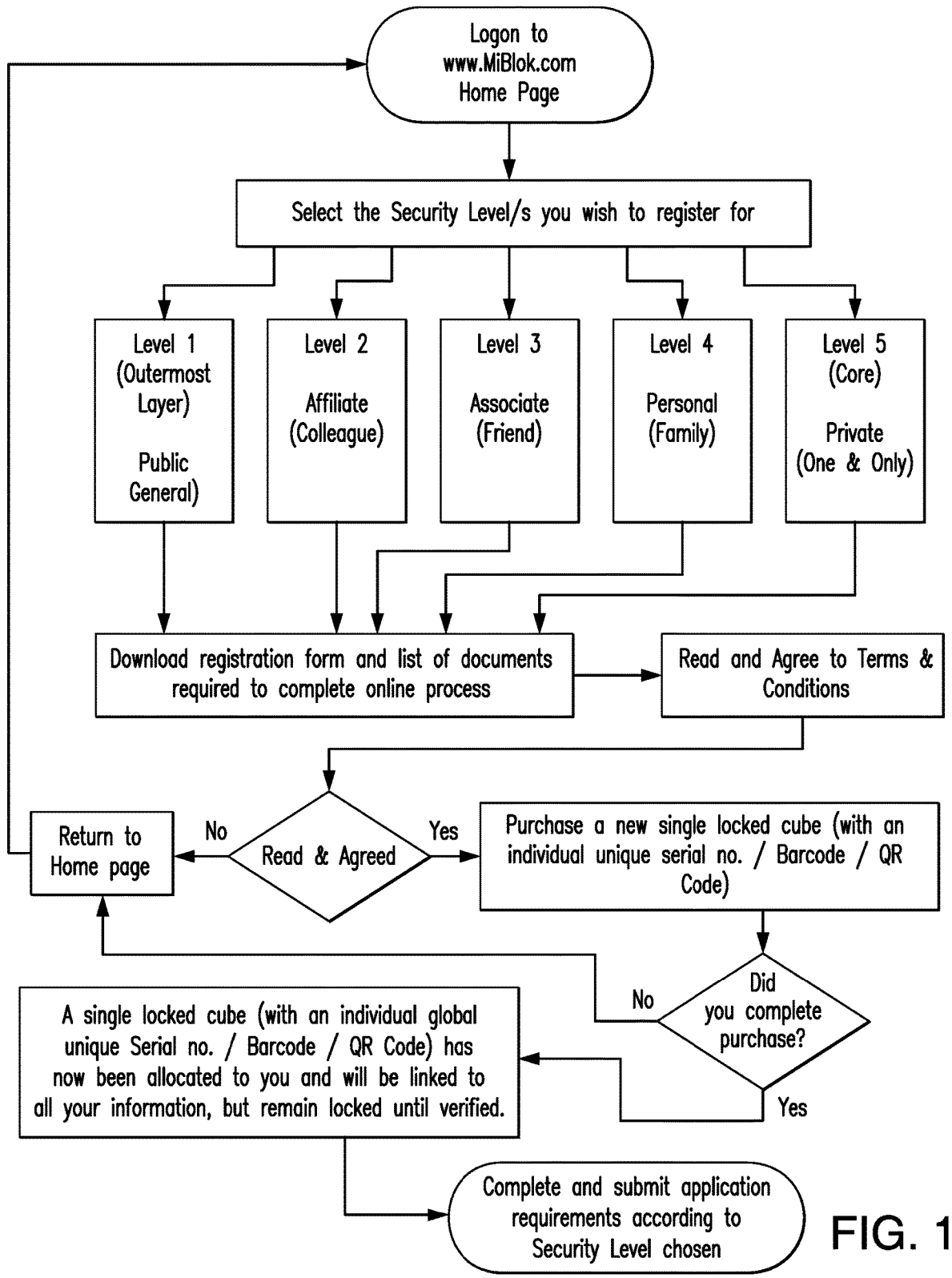
FIG. 1 is a schematic diagram illustrating a sequence of the frontend registration operation of the system and method through an online application, for the 'People' category only in accordance with a preferred embodiment.

The invention provides a system and method for creating and maintaining members that have been verified and authenticated. Accredited members will be placed into only one of four categories being People, Products, Places or Services. Each accredited member will be represented by an individual cube, that is issued with a unique global individual serial number, barcode or QR code that will remain its unique global identification number forever, as shown in the embodiment of FIG. 1. The system provides a diverse platform using a particular structure and format that focuses on full integration of all socio and economic activities by presenting a unique structure, integrating and linking People, Places, Products and Services, equally, using a global or de-centralized database, a global computer network and any compatible hardware devices.

This system and method of creating and maintaining accredited members will evolve into a global identification system that enhances trustworthiness and liability. Throughout the following description of the invention, the system and method are referred to as "MiBlok."

Registration, Verification and Authentication

To become an accredited member of MiBlok you need to register online. Following registration the process will then move onto a verification and authentication system unique to MiBlok. Accredited members, once authenticated, can only be placed in one of four of the following categories: People, Products, Places or Services.

The process and method of registration to be an authenticated member on MiBlok is as follows:

I. Registration

Figure 2:
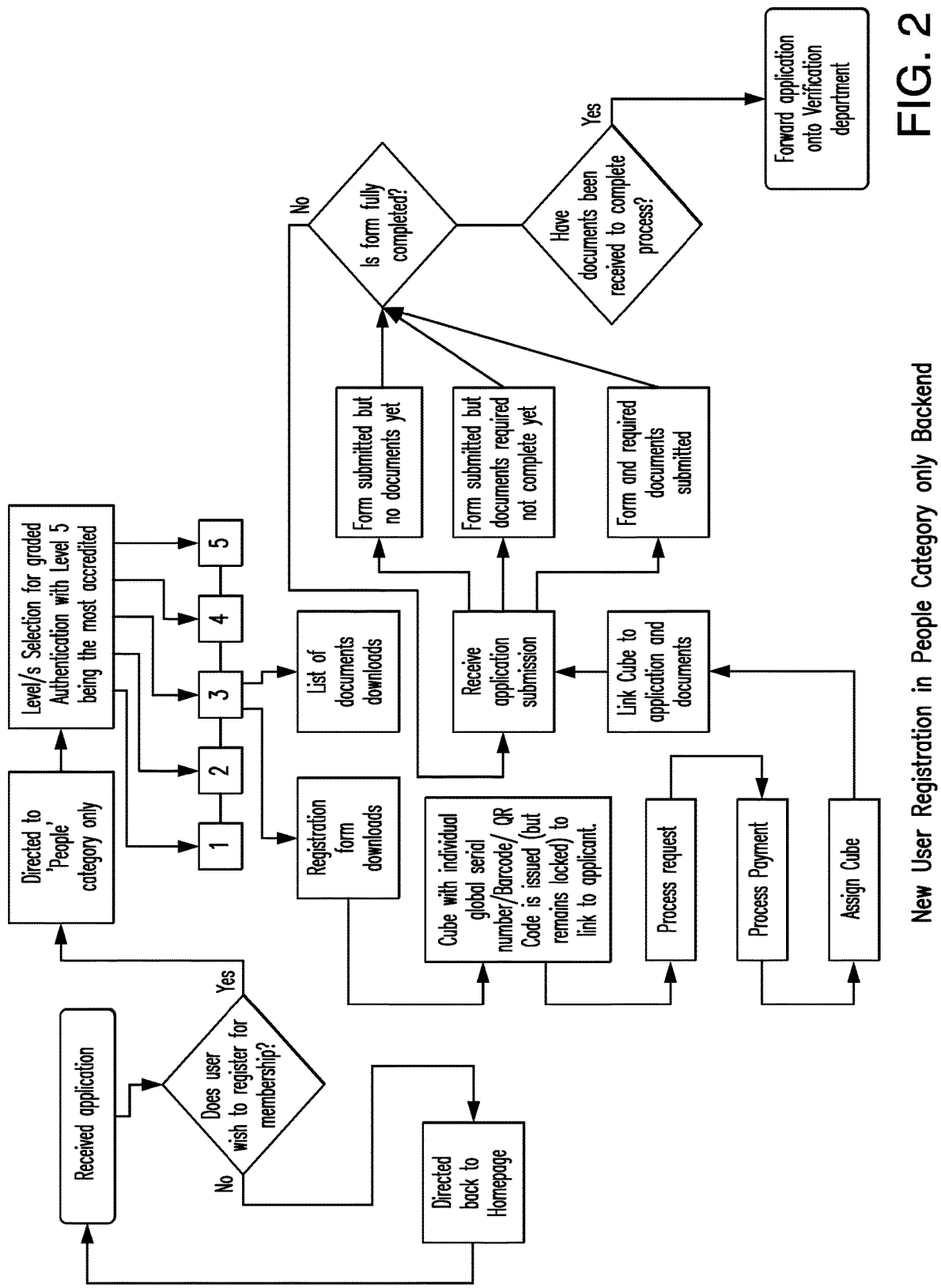
FIG. 2 is a schematic diagram illustrating a sequence of the authorization operation of the system and method executed through a process of cross-checking and completing the online registration application, for the 'People' category only in accordance with a preferred embodiment.

It is imperative to the process, that firstly, a verified person must own a cube, issued with a unique global individual serial number, barcode or QR code prior to an application in any of the other categories such as Products, Places or Services. Referring to FIGS. 1-2, an individual person, for example, will register to be a member in the category of people.

To register, go online to www.MiBlok.com.

Download the form to be completed along with a list of documents to be submitted on registration.

Simultaneously on submission, purchase of cube is necessary in order to allocate and link the unique global individual serial number, barcode or QR code. The information submitted will then be linked to the serial numbered cube, even if the purchaser does not become verified at this time. The cube will remain inactive and the information will remain linked to the unique serial numbered cube as locked until verified.

Level 1 to Level 5 visual identification of members will support you in the quality of all socio-economic interactions. Level 5 being the highest and most credible member.

The minimum information required to register for the most basic status per category, will be as follows:

People

Level One/Layer 1—Public (General)

The MiBlok visual identification linked to you as a member will display Level 1 after verification.

Name

Cellular/mobile number

Identification (government ID document/card) number

Address and/or geo-location of home residence

Postal address

Utility Bill

Photo

Any other identification

All contact details relating to home

Education details

Any other means deemed necessary by MiBlok from time to time

A People member will only be issued with a cube that has a unique global individual serial number, barcode or QR code once verified and authenticated if all the above mentioned criteria has been met.

II. Verification

Once all the documents are received and successful verification has been achieved, the individual person will be considered to be authentic and now becomes a member of MiBlok, in the category of people.

Entrance into the 'People' category will always begin at Level One offering interaction on the public level only. The purchased cube (that has a unique global individual serial number, barcode or QR code) will be unlocked and available to be populated with information about the accredited member, in accordance with the six standard questions, in order to interact on the MiBlok platform.

In order to progress to further levels determining content security, the accredited member will need to submit further information in person (not online), at a MiBlok or MiBlok accredited office.

Level Two/Layer 2—Affiliate (Colleagues and other)

The MiBlok visual identification linked to you as a member will display Level 2 after verification.

Occupation

Company

Proof of Employment
Payslip
Address and/or geo-location of workplace
All contact details of work
Name of Affiliates
Any other means deemed necessary by MiBlok from time to time Once the above information has been submitted and verified to be authentic, the second layer will be unlocked and available for population.

Level Three/Layer 3—Associate (Friends)

The MiBlok visual identification linked to you as a member will display Level 3 after verification.

Names of 5 Associates
Connection—Where did you meet and how many years of friendship
Associate details—Cellphone, Address, Occupation etc
Any other means deemed necessary by MiBlok from time to time Once the above information has been submitted and verified to be authentic, the third layer will be unlocked and available for population.

Level Four/Layer 4—Personal (Family)

The MiBlok visual identification linked to you as a member will display Level 4 after verification.

Name, ID and Relationship of family member
Address and/or geo-location of their residence
Address and/or geo-location of their workplace
If adopted and/or fostered, name of agency
Any other means deemed necessary by MiBlok from time to time Once the above information has been submitted and verified to be authentic, the fourth layer will be unlocked and available for population.

Level Five/Layer 5/Core—Private (One & Only)

The MiBlok visual identification linked to you as a member will display Level 5 after verification.

Medical Records
Blood Tests
DNA
Fingerprint
Facial Recognition
Retina Display
Any other means deemed necessary by MiBlok from time to time Once the above information has been submitted and verified to be authentic, the fifth layer will be unlocked and available for population.

Core members (who achieve level 5 status) will automatically raise the linked status of other MiBlok accredited members purely by association as part of the holistic authentication process. Authentication is adjudication dependent on criteria being met and regular updates being managed.

III. Only an Individual Person as a Verified Member in the Category of People can Now List a Product, Place or Service as a Member in the Product, Place or Service Category Respectively.

Figure 3:
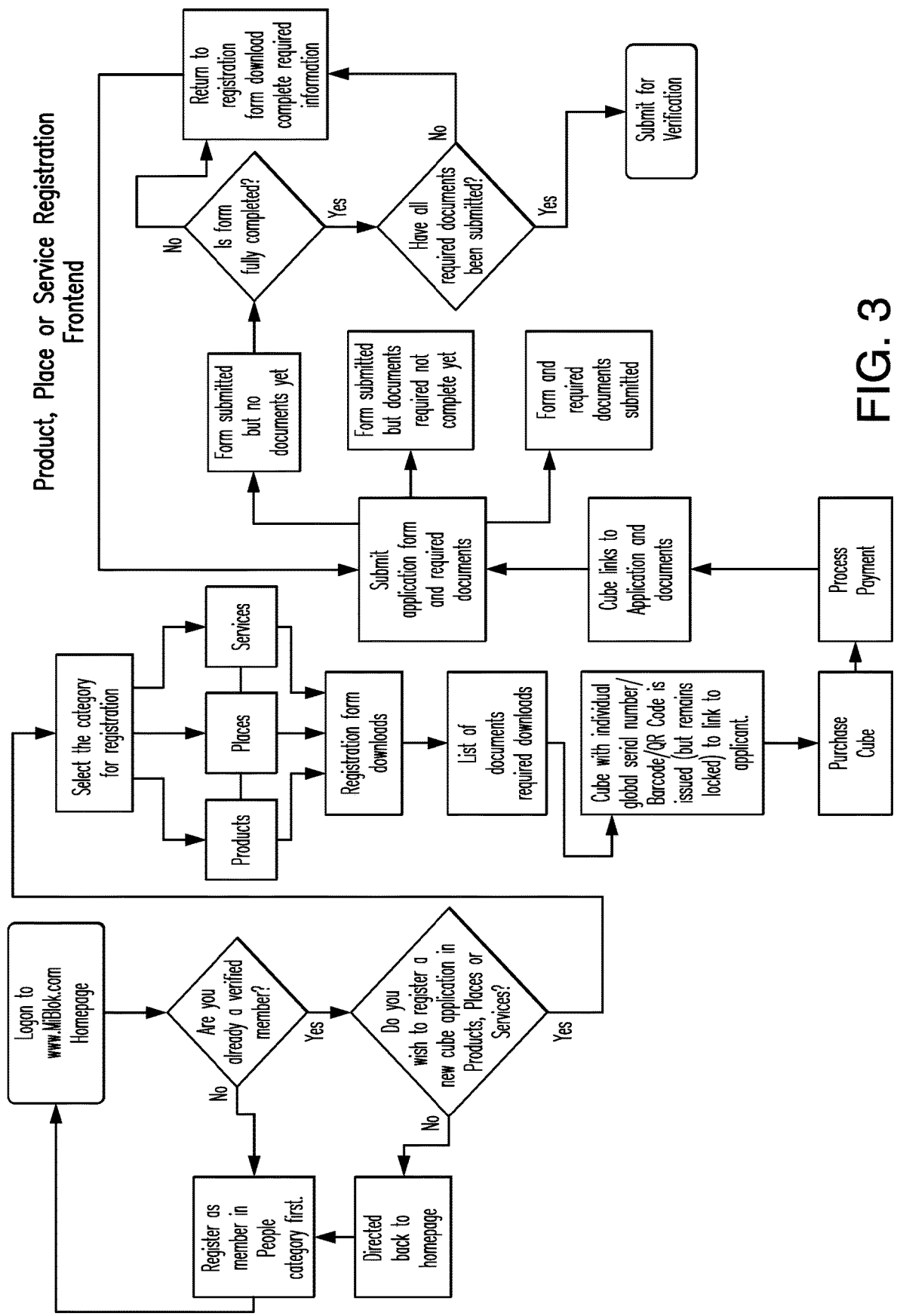
FIG. 3 is a schematic diagram illustrating a sequence of the frontend registration operation of the system and method through an online application, for the Products, Places and Services categories respectively in accordance with a preferred embodiment.
Figure 4:
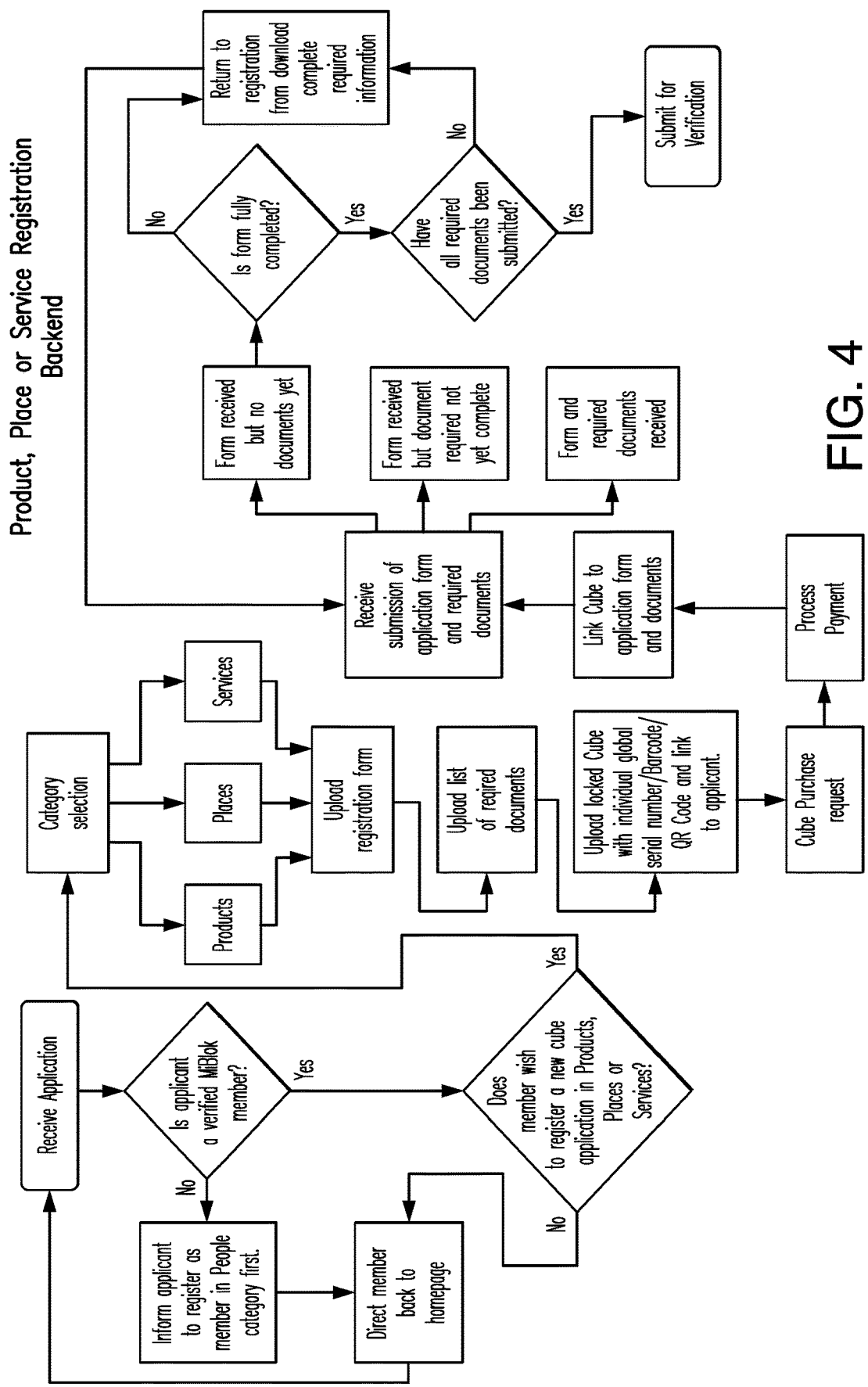
FIG. 4 is a schematic diagram illustrating a sequence of the authorization operation of the system and method executed through a process of cross-checking and completing the online registration application, for the Products, Places and Services categories respectively in accordance with a preferred embodiment.

Registration can now be implemented for a product, place or service that will need its own cube (that has a unique global individual serial number, barcode or QR code), by downloading the registration form and submitting the following list of documents per category (see FIGS. 3-4).

Products
Information needed if applicable
Patent
Proof of intellectual property
Trademark
Serial number
Barcode
Copyright
Owner consent
Geolocation of different industries such as factory, farm, manufacturing plant or industry unit
Classification in governance of formal or informal . . . .
Photo
Any other identification
Any other means deemed necessary by MiBlok from time to time A product member will only be issued with a cube that has a unique global individual serial number, barcode or QR code once verified and authenticated if all the above mentioned criteria has been met.

Places Information needed if applicable
Deed of property owned
Geolocation (latitude and longitude as a world standard)
Classification in governance of public, county, municipal in order of private residential and commercial correspondingly
Photo
Any other identification
Confirmation of Homeowners Association
Confirmation by city of landmarks
Confirmation of registration & membership of sporting associations
Any other means deemed necessary by MiBlok from time to time A place member will only be issued with a cube that has a unique global individual serial number, barcode or QR code once verified and authenticated if all the above mentioned criteria has been met.

Services
Information needed if applicable
Proof of business ownership/municipality/associations etc.
Classification in governance regarding licensing, registration documents such as Health and safety, ISO standards
Geolocation (latitude and longitude as a world standard)
Current business status is planning, development, production and distribution
Identification of big, medium and small business enterprise in order of formal to informal industry operation type such as medical, agriculture, finance, etc.
Councils and governance services . . .
Photo
Any other identification
Any other means deemed necessary by MiBlok from time to time A service member will only be issued with a cube that has a unique global individual serial number, barcode or QR code once verified and authenticated if all the above mentioned criteria has been met.

IV. Once the required information is verified, the product, place or service will be deemed authentic and may interact as an equal member of the accredited online community on the MiBlok platform. Iterate, every product, place or service will be represented online equally to people. Every Product, Place or Service will receive representation which is equal to that of People.

The MiBlok secure platform will create safer interaction between all authenticated members directly.

Only accredited members can now interact on a social and economic basis in the more secured and safe online world of MiBlok. People, products, places and services that are accredited members of the MiBlok world will be immediately recognizable on the global search engines because of the MiBlok logo identification. It will become preference to interact with the accredited members of MiBlok due to them being verified and authenticated, thereby making it a safer platform on the global internet system.

V. Authentication

Figure 5:
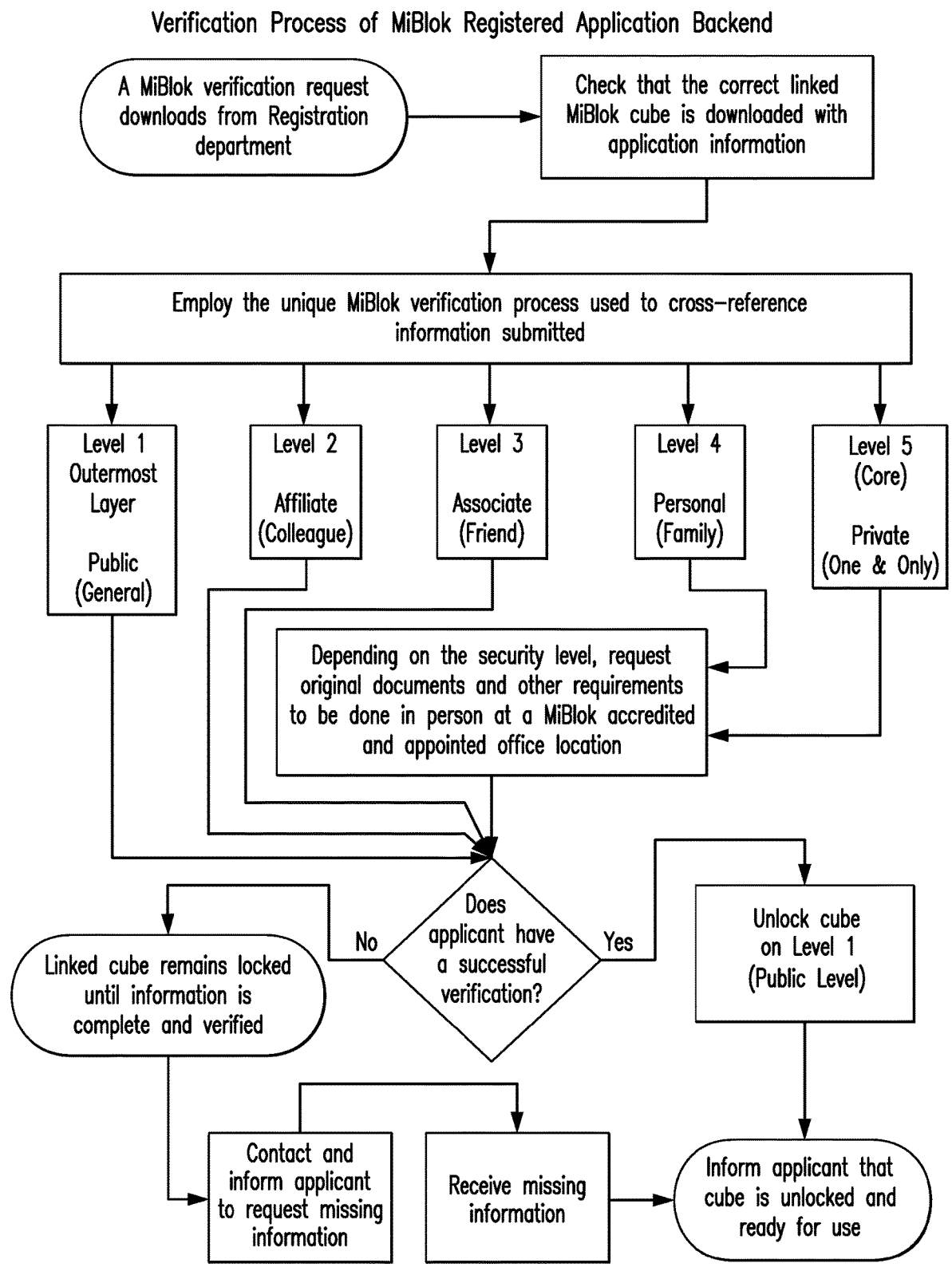
FIG. 5 is a schematic diagram illustrating a sequence of authorization operation of the system and method executed through a stringent and unique verification process, for the each and every application irrespective of category in accordance with a preferred embodiment.

The full extent of the authentication process will take time to develop on the MiBlok platform as it is peer-to-peer related (see FIG. 5). The more members that are linked with credibility, the higher the level of authentication. The same process will operate in reverse should members who have vouched for other members be found to be disreputable.

VI. Linked as Cubes

Cubes

Figure 6:
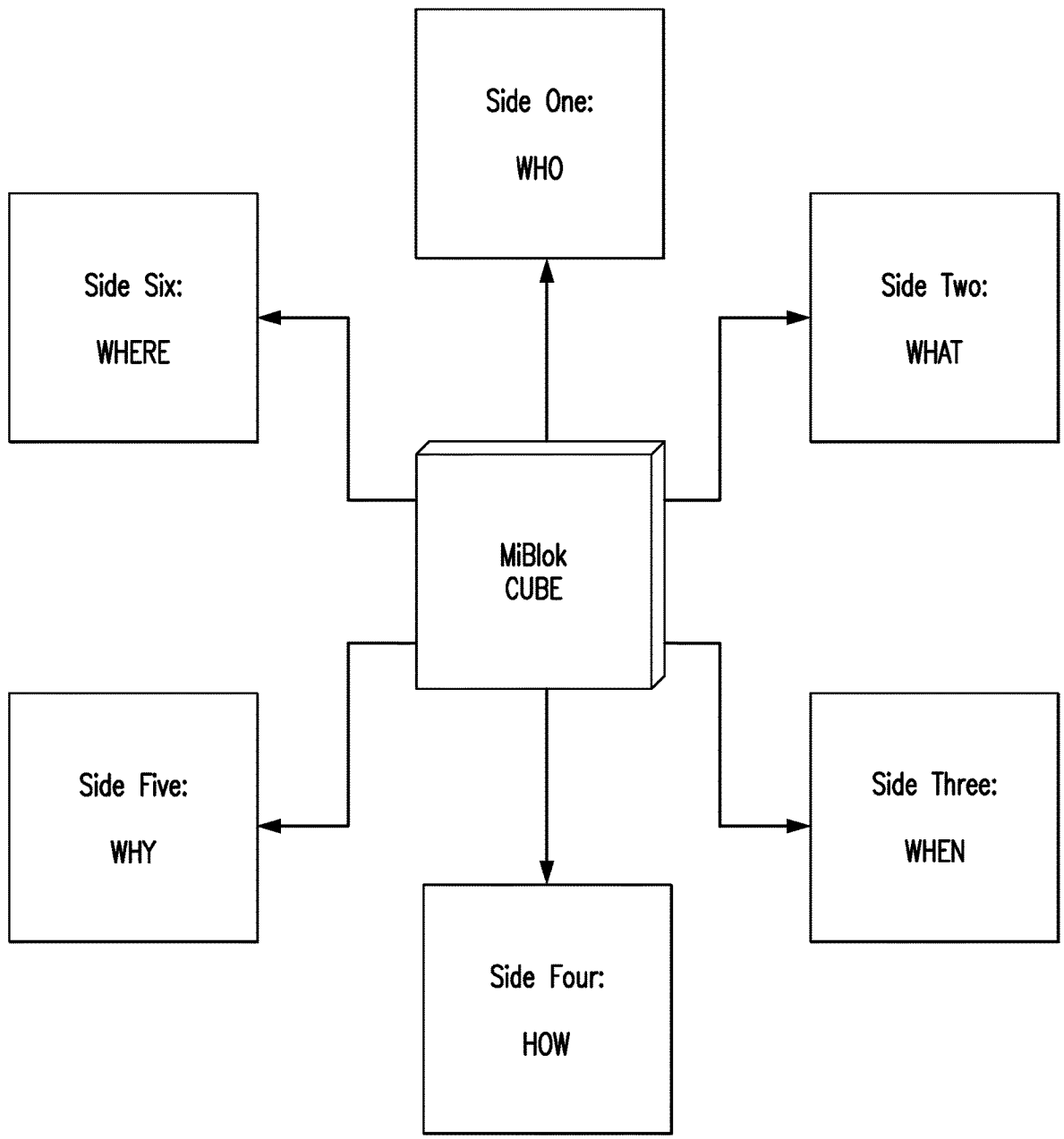
FIG. 6 is a perspective diagram illustrating the basic cube structure as a regular hexahedron; as well as six-sided properties of a cube according to the system and method of the present invention, wherein the system and method uses the geometrical properties of the cube through a simulation software program with the support of an operating system on any electronic device having a graphical user interface.
Figure 7:
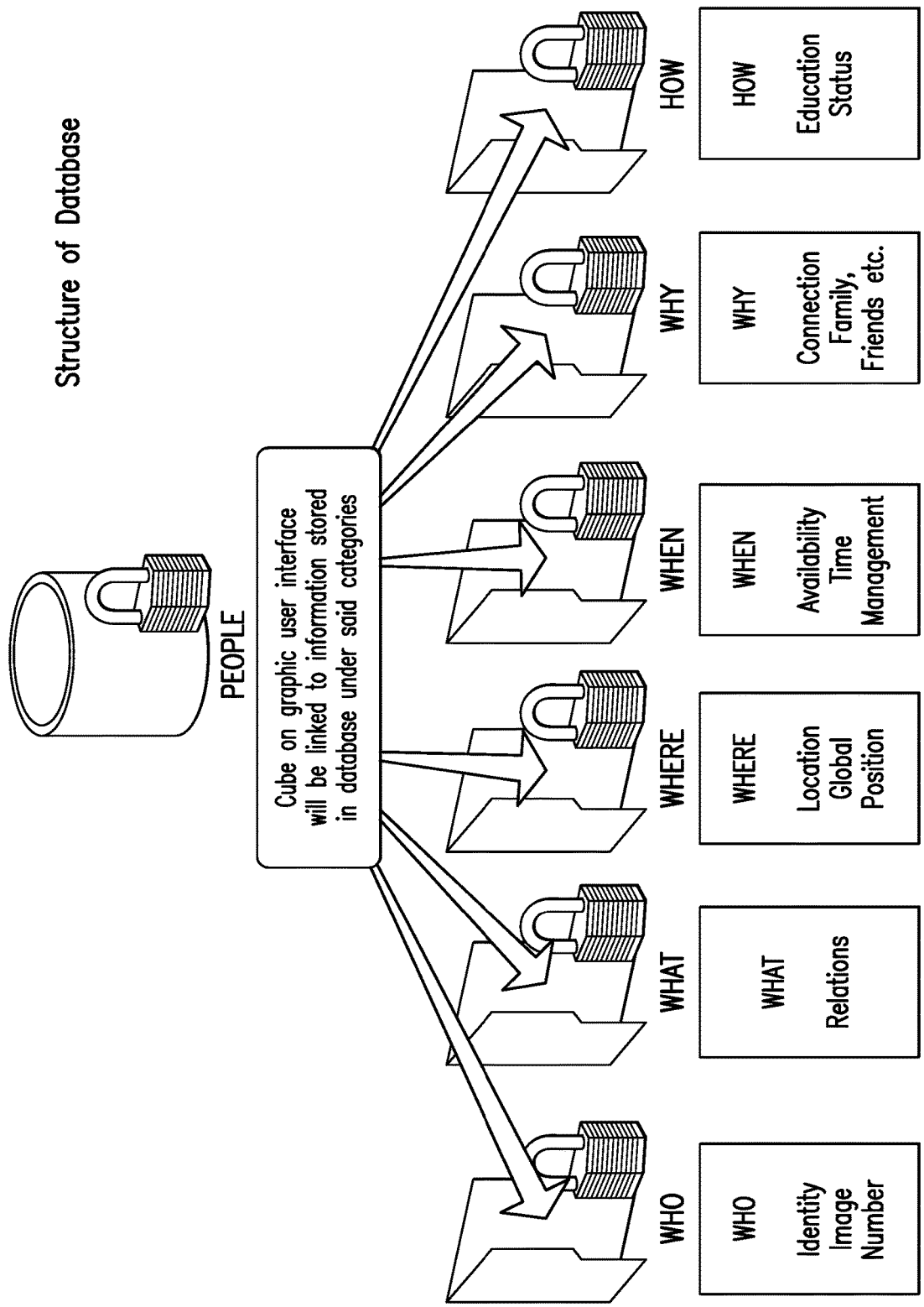
FIG. 7 is a perspective diagram illustrating the structure of the database of the system and method to populate the cube for the People category only, relating to the six standard questions that cover the full spectrum of its existence.

A cube is the only unique entity that accommodates the standardized six content labels that contain the necessary information pertaining to any website (personal, company or other) regarding Who, What, Why, When, Where and How (see FIG. 6).

The basic properties of the cube are employed with the unique geometry, a three-dimensional solid object bounded by six square faces, facets or sides, twelve edges and eight vertices.

The geometric properties of the cube are simulated as per software requirements using a graphical user interface with the support of an operating system on any electronic device on different platforms as an app or migrated to its own online virtual platform.

Figure 8:
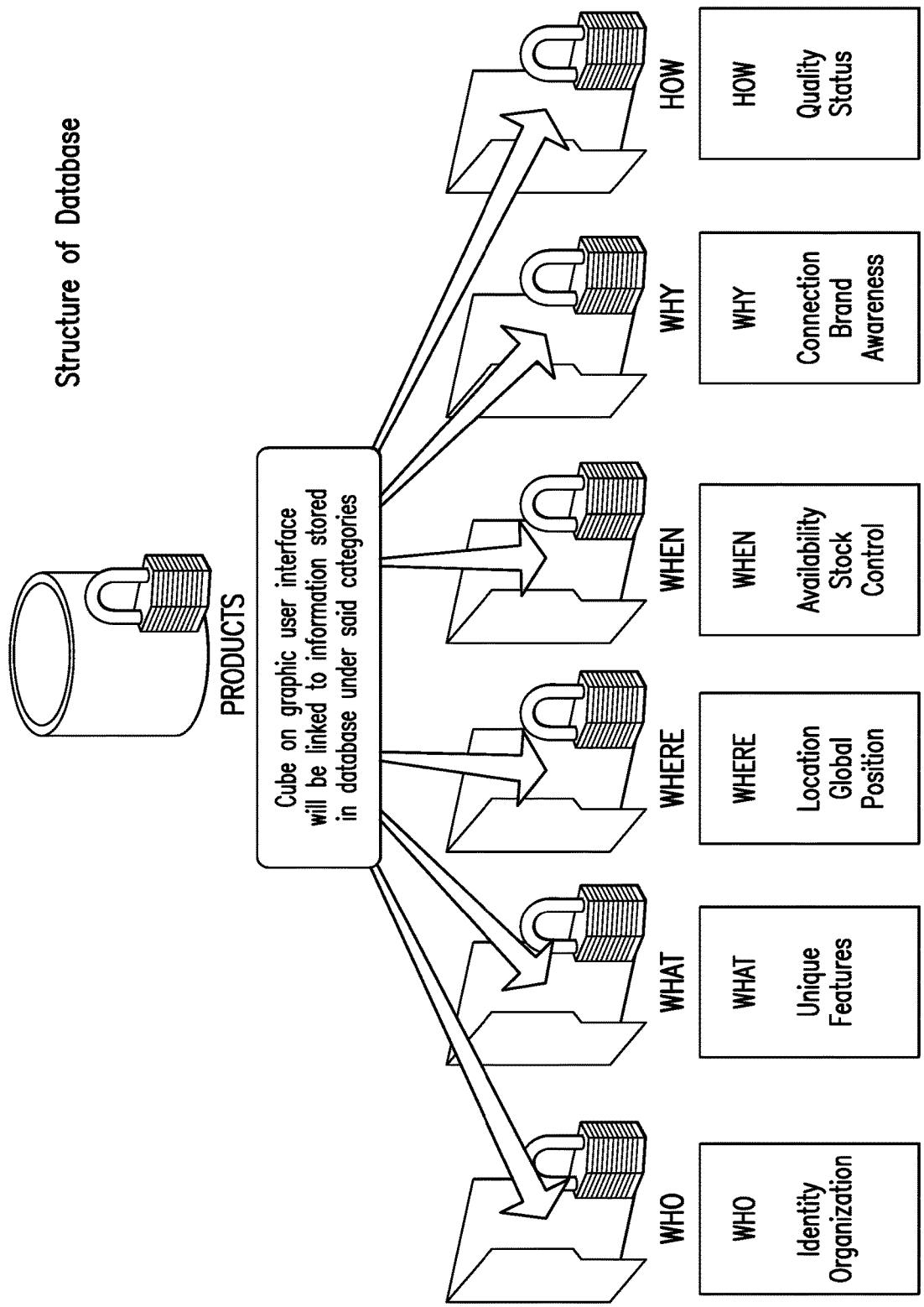
FIG. 8 is a perspective diagram illustrating the structure of the database of the system and method to populate the cube for the Products category only, relating to the six standard questions that cover the full spectrum of its existence.
Figure 9:
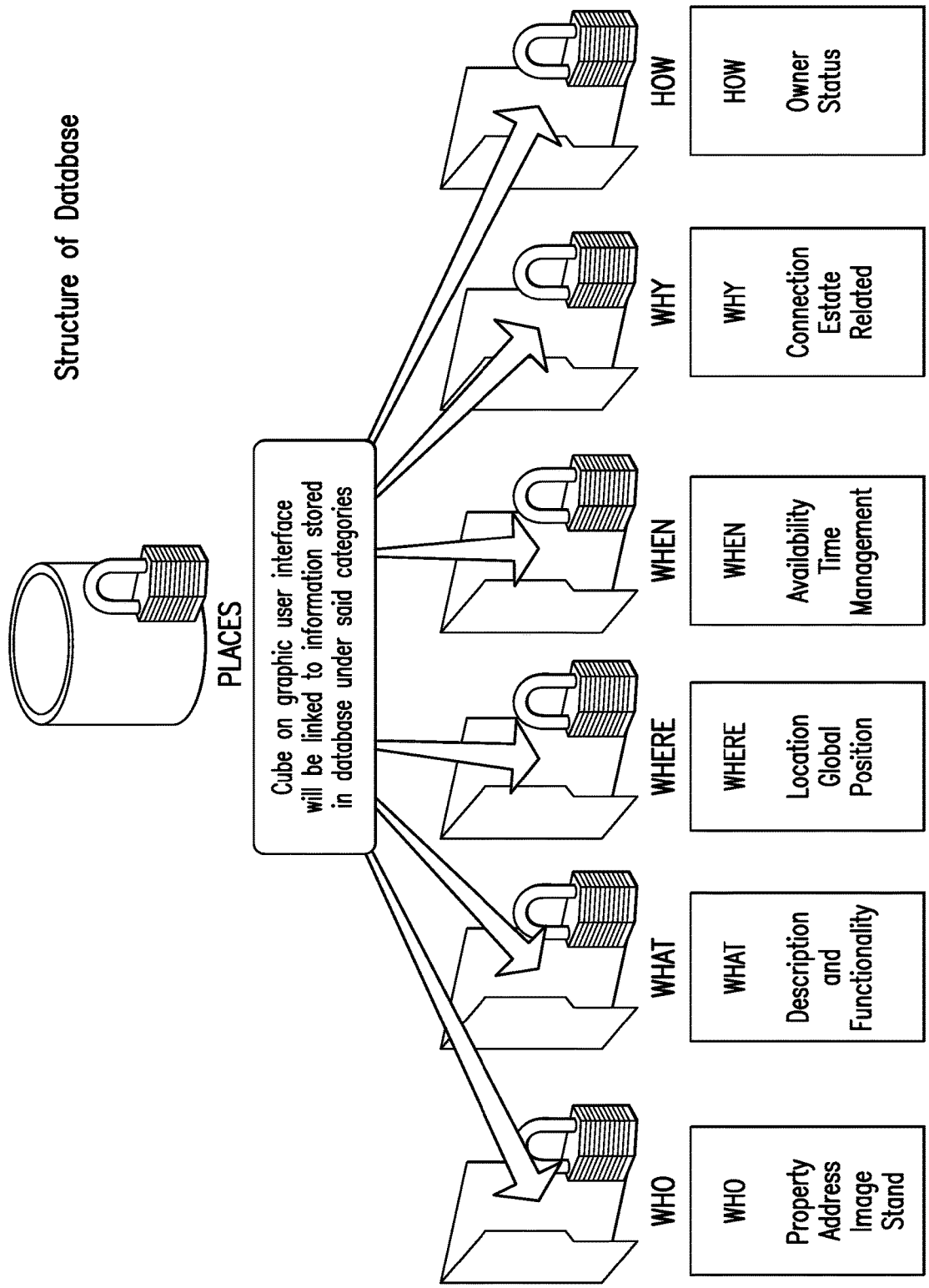
FIG. 9 is a perspective diagram illustrating the structure of the database of the system and method to populate the cube for the Places category only, relating to the six standard questions that cover the full spectrum of its existence.
Figure 10:
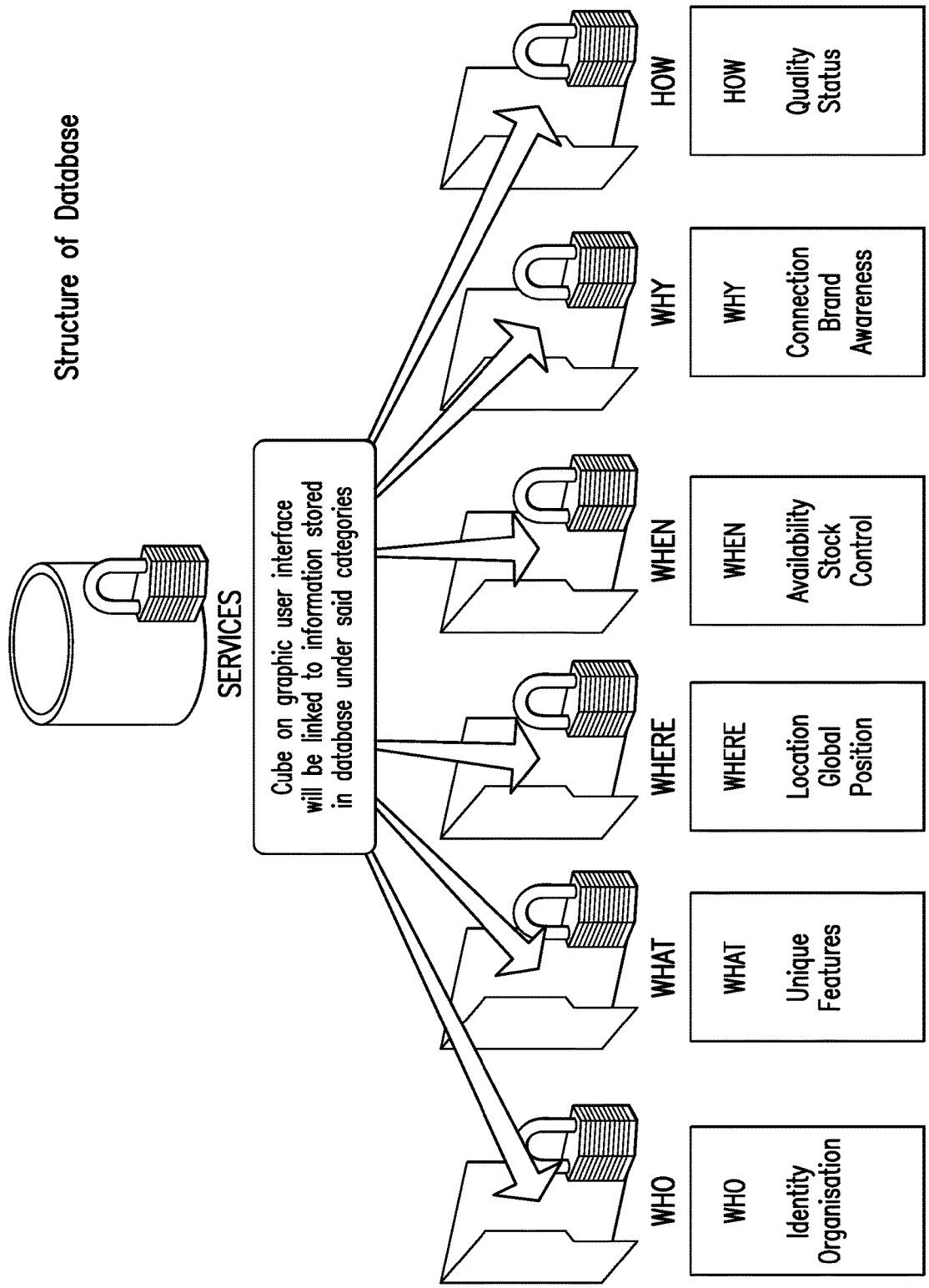
FIG. 10 is a perspective diagram illustrating the structure of the database of the system and method to populate the cube for the Services category only, relating to the six standard questions that cover the full spectrum of its existence.

Each accredited member's cube is presented on a graphic user interface and is linked to the relevant information concerning People, Products, Places and Services stored in a database on the six sides of the cube under the categories of Who, What, Why, When, Where and How (see FIGS. 8-10)

Linked

The object of the online virtual community is to allow authenticated members who have been issued with a unique global individual serial numbered, bar coded or QR coded cube to be linked to user preferences pertaining to social and/or economic purposes. This allows members to interact with REAL people (not fake profiles), genuine products (not fake copies), actual places (not fake businesses or facilities) and quality services (not poor sub-standard services). MiBlok's processes will flag any fake or sub-standard application, or more importantly maintain correct and evolving information about all of its members in all four categories. This service will be a constant process that will monitor and immediately flag any changes that may occur to compromise the safety and integrity of a genuine accredited MiBlok community.

Since all members are represented by a single (global identification serial numbered) cube, it can only produce a more authenticated socio and economic world. Multiple people, products, places and services exist but with the authentication and flagging processes, a distinction can now be made.

VII. Socio-Economic Activities

Search

MiBlok will create a faster, more efficient, fun and successful way to an exact search match. The MiBlok authenticated members will be linked to a single cube that supports the search requirement. It will be easier to locate other members in any of the four categories. This better method of finding authenticated members will encompass, every time, the six basic questions of Who, What, Why, When, Where and How, that we ask about everything on a daily basis. Information will be stored and accessed on different content levels based on secure authentication levels. Search on the MiBlok system will present the highest level of authenticated members first, grading down accordingly.

Social

Communications such as text messaging, voice messaging and video messaging are facilitated amongst members. Messages shared amongst members are protected through the five content protection levels.

MiBlok will introduce legal systems for anybody who breaks the contractual rules. For example advertising non-registered MiBlok products or services, or cyber bullying on the MiBlok platform. There will be immediate action taken and repercussions for the member involved. The system has to enforce an extremely strong security process to protect members who have opted to operate with integrity in an online community. Members will be informed and educated as to the strict levels of security, as the process and system will flag connected members that behave inappropriately as much as it will accredit positively those who adhere to the rules governing them.

Economic

Economic activity and transactions will be secure due to the authentication status of the MiBlok members. With peer-to-peer transacting, limiting third party involvement.

VIII. Secure Content

Figure 11:
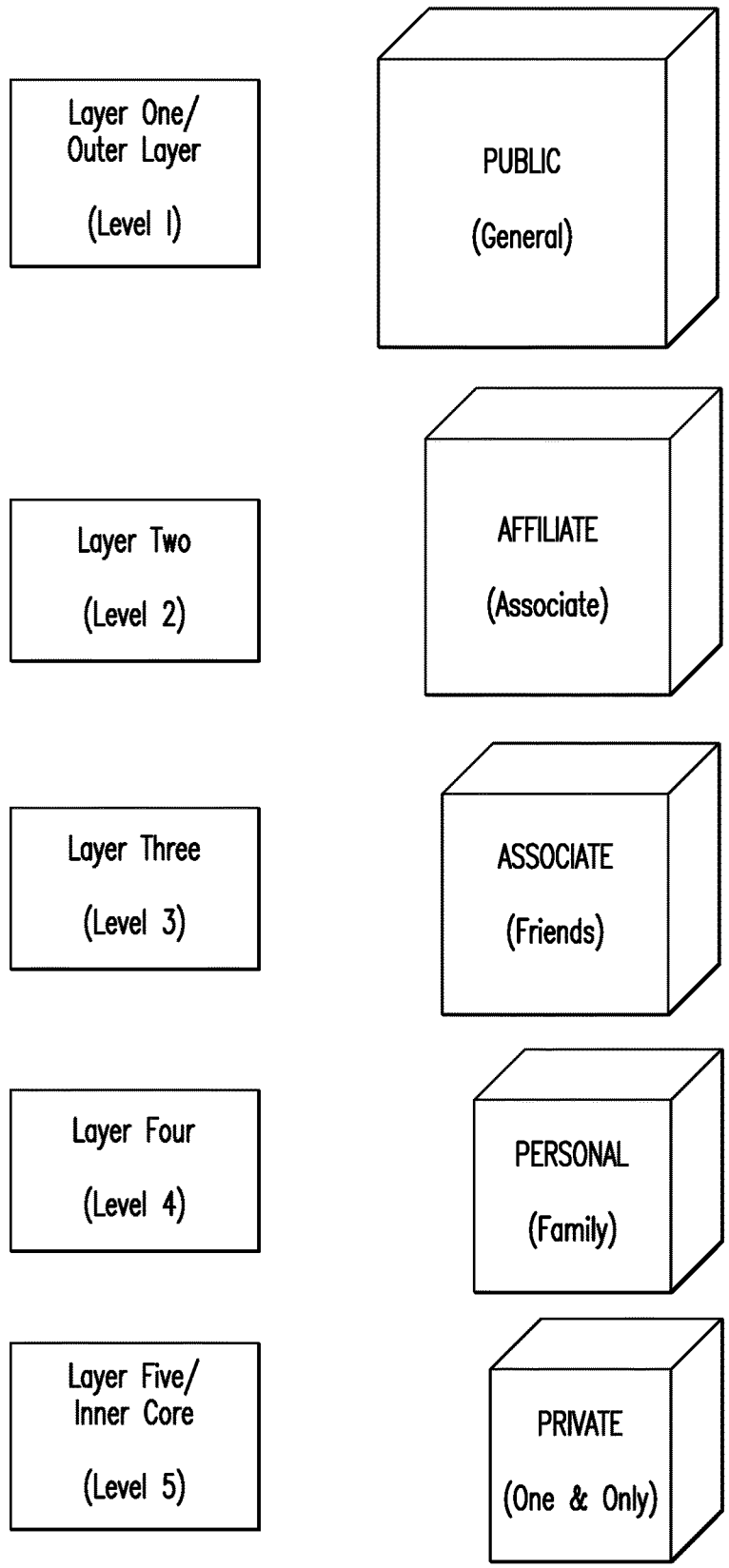
FIG. 11 is a perspective diagram illustrating the onion skin security method for all members. It illustrates the five content levels of security, graded from Public (low) to Private (high)

The five content levels are modelled in the context of an onion, of which the different layers are related to the properties of the cube, including information pertaining to the six content labels (see FIG. 11).

The content protection layers (onion skin)/levels are as follows:

| | |
|---|---|
| Layer 1 (Level 1) | Public - General |
| Layer 2 (Level 2) | Affiliate - Colleagues & Other |
| Layer 3 (Level 3) | Associate - Friends |
| Layer 4 (Level 4) | Personal - Family |
| Layer 5 (Level 5) | Private - One & Only |

Figure 12:
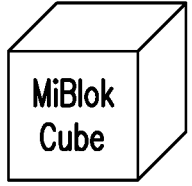
FIG. 12 is a tabled diagram illustrating the five graded levels of security relating to each individual member, with every level having different information requirements, wherein a graded process from name to DNA is needed to reach the different levels of the onion skin process.
Figure 13:
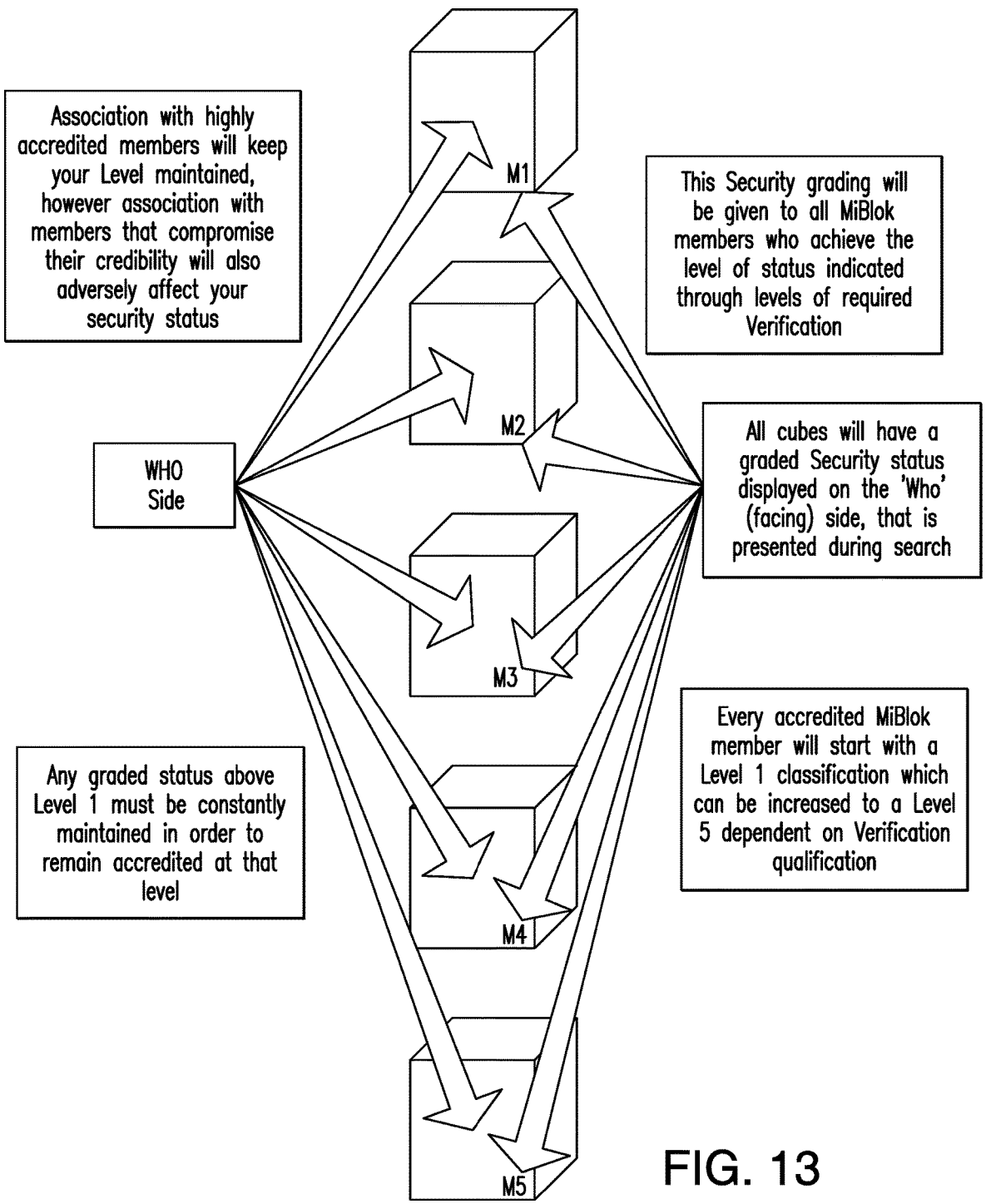
FIG. 13 is a perspective diagram illustrating the visual grading results of each member on the side of the cube that will always present itself as the result of a search.

Referring to FIGS. 12-13, the five content protection levels make the interactions more secure between members rather than what is currently offered.

People

In the people category, content will only be accessible to other authenticated members.

People will be encouraged to aspire to attain Level 5 status. In order to achieve the higher levels more stringent verification processes will need to be completed such as DNA, fingerprints, retina scan etc. These will be done, in person, by a MiBlok accredited affiliate. Then the utopia is to grow the MiBlok business model to have a MiBlok business unit in every country, city, town, shopping centre etc.

The aim of achieving a higher level is to fully store all your personal information in one place to be shared at your own discretion with whomsoever you choose including Banks, Schools, Hospitals etc.

Content at the Public level is meant to be shared with all other authenticated members.

Unrestricted content at Affiliate level is meant to be shared with other authenticated members such as colleagues and other related individuals if needed.

Unrestricted content at Associate level is meant to be shared with other authenticated members such as friends.

On the Personal level, unrestricted content is meant to be shared with other authenticated members such as family (spouse, father, grandfather, mother, grandmother and children etc.).

The intention of content in the Private level will only be accessible to the authenticated member of their own actual cube. At this level you will also be able to do banking, buying, selling or share highly guarded information with another accredited member of your choice.

Products

Content, such as marketing advertising and other necessary interaction, etc., at the Public level is meant to be shared with all other authenticated members.

Unrestricted content at Affiliate level such as product features if/when needed is meant to be shared with other authenticated members.

Unrestricted content at Associate level such as product specifications if/when needed is meant to be shared with other authenticated members.

Unrestricted content at Personal level such as product confidentiality if/when needed is meant to be shared with other authenticated members.

In the case of products, the intention of content, at Private level, should be accessible to the member or chosen members of the listed product as an authenticated member only for selling and buying purposes.

Places

Content, such as marketing advertising and other necessary interaction, etc., at the Public level is meant to be shared with all other authenticated members.

Unrestricted content at Affiliate level such as place features if/when needed is meant to be shared with other authenticated members.

Unrestricted content at Associate level such as place specifications if/when needed is meant to be shared with other authenticated members.

Unrestricted content at Personal level such as place ownership and title deed if/when needed is meant to be shared with other authenticated members.

In the case of places, the intention of content, at Private level, should be accessible to the member or chosen members of the listed place as an authenticated member only for whatever highly guarded private use may be deemed necessary.

Services

Content, such as marketing advertising and other necessary interaction, etc., at the Public level is meant to be shared with all other authenticated members.

Unrestricted content at Affiliate level such as service features if/when needed is meant to be shared with other authenticated members.

Unrestricted content at Associate level such as service specifications if/when needed is meant to be shared with other authenticated members.

Unrestricted content at Personal level such as business ownership and business licensing if/when needed is meant to be shared with other authenticated members.

In the case of services, the intention of content, at Private level, should be accessible to the member or chosen members of the listed service as an authenticated member only for whatever highly guarded private use may be deemed necessary.

IX. Moving Globally with a Cube

As the database of the MiBlok platform grows globally, so will the way in which the cubes move and interact within the global village. An accredited user (Person) may travel for business using an airline (Service) to a destination (Place) in another part of the world. Upon arrival (Place) a localized set of cubes will automatically become available via a complex geo-fenced system to present options such as a taxi (Service) to the hotel (Product) where after check-in, a meeting at a conference centre (Place) will be attended followed by a meal at a restaurant (Place).

As geo-fencing plays a key part of the MiBlok system, moving through neighbourhoods, cities and countries will reveal accredited members of People, Product, Places and Services accordingly if that owner deems it necessary.

X. Details Relating to Scenario Interactions

Member Interaction

It may well be in the future that just by locating the restaurant's cube, a reservation can be made directly by accessing the 'When' side which will reveal the opening and closing times as well as blocks that represent open tables (indicating seating). With the ease of sliding your block over a table block, the reservation is made and considered confirmed in a time slot available. Should there be a need to cancel, according to the stipulated cancellation policy of the restaurant, then it is just as easy to slide your cube off the table block to return it to available status for another booking. Payment for a meal or cancellation fee will follow the same easy method of sliding your block over the table to make payment before your block is released from the restaurant system.

In the same way a Massage Therapist (Person) wishes to purchase a massage table (Product) and towels (Product) to build up the equipment needed to provide massages (Service) for people booking appointments at a salon (Place). The therapist will search for the accredited members, a massage table and towels, cubes (in the Product category). Prepared with the equipment needed, the therapist will then list the massage service (in the Services category) as well as the salon (in the Place category). An accredited member looking to book a massage will search either Service or Place, then book and pay in an almost identical way to the restaurant booking described above.

What is claimed is:

1. A method comprising:
registering, by a computer platform, individual members including a first individual member, the registering of the first individual member comprising:
providing a form to the first individual member via a web site; and
receiving a submission of the form from the first individual member;
obtaining information from each one of the registered individual members;
issuing, by the computer platform, a unique global individual code to each of the registered individual members including issuing a unique global individual code to the first individual member in response to a purchase of a cube by the first individual member, the purchased cube remaining inactive as locked until the first individual member is verified;
storing the information of each of the registered individual members in a database, the information of each registered individual member being associated with the unique global individual code issued to the registered individual member;
based on verifying the first individual member, unlocking the purchased cube and setting the first individual member at a first graded authentication level;
based on information from a first registered individual member comprising employment data, progressing the first registered individual member from the first graded authentication level to a second graded authentication level; and causing display of search results for a search in a graphical user interface, each search result being displayed as a six-sided cube comprising data for a corresponding registered individual member, the search results being ordered based on graded authentication levels for the corresponding registered individual members, the search results including the purchased cube.

2. The method of claim 1, wherein the graphical user interface displays a first cube of the search results with each of the six sides linked to different information associated with the unique global individual code issued to the registered individual member corresponding to the first cube.

3. The method of claim 1, further comprising: classifying the information of the first registered individual member according to a plurality of content protection levels for controlling and restricting access to the information of the first registered individual member, the information of the first registered individual member comprising first information classified at a first content protection level and second information classified at a second content protection level.

4. The method of claim 3, wherein the first content protection level allows a maximum degree of access to the first information of the first registered individual member by all other accredited members and the second content protection level limits access to the second information of the first registered individual member to only the first registered individual member.

5. The method of claim 1, wherein the displaying of each search result comprises presenting, on one side of the six-sided cube, an indication of the graded authentication level for the corresponding registered individual member.

6. The method of claim 1, further comprising: selecting the search results based on a location of an electronic device requesting the search.

7. The method of claim 1, further comprising: detecting, via the graphical user interface, a gesture comprising sliding a first cube over a second cube, the first cube corresponding to a user, the second cube corresponding to a business; and in response to the detected gesture, causing a payment from the user to the business.

8. The method of claim 1, further comprising: detecting, via the graphical user interface, a gesture comprising sliding a first cube over a second cube, the first cube corresponding to a user, the second cube corresponding to a business; and in response to the detected gesture, causing a reservation at the business to be made for the user.

9. The method of claim 3, further comprising: based on an authentication level of the first registered individual member, allowing the first registered individual member to store the second information classified at the second content protection level.

10. The method of claim 1, further comprising: based on further information from the first registered individual member comprising family data, progressing the first registered individual member to a third graded authentication level.

* * * * *

UNITED STATES PATENT AND TRADEMARK OFFICE
CERTIFICATE OF CORRECTION

PATENT NO. : 11,356,451 B2  
APPLICATION NO. : 16/450254  
DATED : June 7, 2022  
INVENTOR(S) : Valente et al.

Page 1 of 1

It is certified that error appears in the above-identified patent and that said Letters Patent is hereby corrected as shown below:

In the Claims

In Column 15, Line 16, in Claim 3, after "comprising:", insert a linebreak

In Column 16, Line 5, in Claim 6, after "comprising:", insert a linebreak

In Column 16, Line 8, in Claim 7, after "comprising:", insert a linebreak

In Column 16, Line 11, in Claim 7, after "and", insert a linebreak

In Column 16, Line 14, in Claim 8, after "comprising:", insert a linebreak

In Column 16, Line 17, in Claim 8, after "and", insert a linebreak

In Column 16, Line 20, in Claim 9, after "comprising:", insert a linebreak

In Column 16, Line 25, in Claim 10, after "comprising:", insert a linebreak

Signed and Sealed this  
Twenty-fourth Day of January, 2023

Katherine Kelly Vidal  
*Director of the United States Patent and Trademark Office*